(12) United States Patent
Kessler

(10) Patent No.: US 9,093,854 B2
(45) Date of Patent: Jul. 28, 2015

(54) DAMPING CIRCUIT FOR AN ENERGY STORAGE DEVICE AND METHOD FOR DAMPING OSCILLATIONS OF THE OUTPUT CURRENT OF AN ENERGY STORAGE DEVICE

(71) Applicant: Robert Bosch GmbH, Stuttgart (DE)

(72) Inventor: Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 13/915,757

(22) Filed: Jun. 12, 2013

(65) Prior Publication Data
US 2013/0328507 A1    Dec. 12, 2013

(30) Foreign Application Priority Data
Jun. 12, 2012 (DE) .......................... 10 2012 209 753

(51) Int. Cl.
*H02J 3/00* (2006.01)
(52) U.S. Cl.
CPC ................. *H02J 3/005* (2013.01); *Y02E 10/76* (2013.01); *Y02E 70/30* (2013.01)
(58) Field of Classification Search
CPC .. Y02T 10/7005; G05B 5/01; F02D 2200/503
USPC .................... 318/139, 611; 307/63
See application file for complete search history.

(56) References Cited

U.S. PATENT DOCUMENTS 6,621,244 B1 * 9/2003 Kiyomiya et al. ............ 318/611

FOREIGN PATENT DOCUMENTS

| DE | 102010027857 | 10/2011 |
|---|---|---|
| DE | 102010027861 | 10/2011 |

* cited by examiner

*Primary Examiner* — Karen Masih
(74) *Attorney, Agent, or Firm* — Michael Best & Friedrich LLP

(57) ABSTRACT

A damping circuit for an energy storage device. The damping circuit comprises a current detection device designed to detect an output current of energy supply strings or the energy storage device and to generate an output current signal dependent on the output current. The damping circuit also includes a closed-loop control circuit coupled to the current detection device. The closed-loop control circuit designed to adjust the output current signal to a setpoint current signal and to output a corresponding current control signal. A first winding of a transformer is coupled to an output connection of the energy storage device. A second winding is galvanically isolated from the first winding. A compensation current generation device is coupled to the closed-loop control circuit, and is designed to feed a compensation current into the second winding of the transformer depending on the current control signal.

11 Claims, 4 Drawing Sheets

DAMPING CIRCUIT FOR AN ENERGY STORAGE DEVICE AND METHOD FOR DAMPING OSCILLATIONS OF THE OUTPUT CURRENT OF AN ENERGY STORAGE DEVICE

BACKGROUND OF THE INVENTION

The invention relates to a damping circuit for an energy storage device and to a method for damping oscillations of the output current of an energy storage device, in particular for battery converter circuits for supplying voltage as a variable current source for loads occurring such as, for example, electric machines in drive systems of electrically operated watercraft or land vehicles.

It would appear that, in the future, electronic systems which combine novel energy storage technologies with electric drive technology will be used increasingly both in stationary applications, such as wind turbines or solar power installations, for example, and in vehicles such as hybrid or electric vehicles.

In order to feed alternating current into an electric machine, a DC voltage provided by a DC voltage intermediate circuit is conventionally converted into a three-phase AC voltage via a converter in the form of a pulse-controlled inverter. The DC voltage intermediate circuit is fed by a string of battery modules connected in series. In order to be able to meet the requirements placed on power and energy which are provided for a specific application, a plurality of battery modules are often connected in series in a traction battery. Such an energy storage system is often used, for example, in electrically operated vehicles.

A series circuit comprising a plurality of battery modules is associated with the problem that the entire string fails when a single battery module fails. Such a failure of the energy supply string can result in failure of the entire system. Furthermore, temporarily or permanently occurring reductions in power of a single battery module can result in reductions in power in the entire energy supply string.

Documents DE 10 2010 027 857 A1 and DE 10 2010 027 861 A1 disclose battery cells connected to one another in modular fashion in energy storage devices which can be coupled into or decoupled from the string of battery cells connected to one another in series selectively via suitable actuation of coupling units. Systems of this type are known under the name Battery Direct Converter (BDC). Such systems comprise DC sources in an energy storage module string which can be connected to a DC voltage intermediate circuit for supplying electrical energy to an electric machine or an electrical power supply system via a pulse-controlled inverter.

BDCs generally have increased efficiency and increased fail safety in comparison with conventional systems. The fail safety is ensured, inter alia, by virtue of the fact that defective, failed or incorrectly functioning battery cells can be disconnected from the energy supply strings by suitable bridging activation of the coupling units.

The energy storage module strings in this case have a plurality of energy storage modules connected in series, wherein each energy storage module has at least one battery cell and an associated controllable coupling unit, which makes it possible to bridge the respectively associated at least one battery cell or to connect the respectively associated at least one battery cell into the respective energy storage module string depending on control signals. Optionally, the coupling unit can be designed in such a way that it additionally makes it possible to connect the respectively associated at least one battery cell into the respective energy storage module string even with inverse polarity or else to interrupt the respective energy storage module string.

The total output voltage of BDCs is determined by the actuation state of the coupling unit and can be set gradually, wherein the graduation of the total output voltage is dependent on the individual voltages of the energy storage modules. Owing to intrinsic complex impedances of the energy storage modules and their components, the energy storage device acts with a downstream intermediate circuit capacitor as a resonant circuit. The resonant frequency of this resonant circuit can vary with the number, which differs depending on the voltage requirement, and the clock-pulse rate of the connected energy storage modules. This means that, when the energy storage device is coupled to a load acting as variable current source, such as an inverter and an electric machine connected downstream of the inverter, for example, undesired resonances can occur.

There is therefore a need for measures with which the occurrence of such resonances or current fluctuations during coupling of a BDC to an intermediate circuit capacitor for feeding a load acting as variable current source can be reduced or suppressed.

SUMMARY OF THE INVENTION

In accordance with one embodiment, the present invention provides a damping circuit for an energy storage device, which has one or more energy storage modules which are connected in series in one or more energy storage strings, said energy storage modules comprising at least one energy storage cell and one coupling device with a multiplicity of coupling elements, which coupling device is designed to selectively connect the energy storage cell into the respective energy supply string or to bridge said energy storage cell. The damping circuit comprises a current detection device, which is designed to detect an output current of the energy supply strings or the energy storage device and to generate an output current signal dependent on the output current, a closed-loop control circuit, which is coupled to the current detection device and is designed to adjust the output current signal to a setpoint current signal and to output a corresponding current control signal, a transformer, which has a first winding, which is coupled to an output connection of the energy storage device, and a second winding which is galvanically isolated from the first winding, and a compensation current generation device, which is coupled to the closed-loop control circuit and is designed to feed a compensation current, which compensates for fluctuations in the output current of the energy storage device, into the second winding of the transformer depending on the current control signal.

In accordance with a further embodiment, the present invention provides a system, comprising an energy storage device, which has one or more energy storage modules, which are connected in series in one or more energy supply strings, said energy storage modules comprising at least one energy storage cell and a coupling device having a multiplicity of coupling elements, which coupling device is designed to connect the energy storage cell selectively into the respective energy supply string or to bridge said energy storage cell, and a damping circuit according to the invention.

In accordance with a further embodiment, the present invention provides a method for damping oscillations of the output current of an energy storage device, which has one or more energy storage modules, which are connected in series in one or more energy supply strings, said energy storage modules comprising at least one energy storage cell and a coupling device having a multiplicity of coupling elements, which coupling device is designed to connect the energy storage cell selectively into the respective energy supply string or to bridge said energy storage cell. The method comprises the steps of detecting an output current of the energy supply strings or the energy storage device, generating an output current signal which is dependent on the detected output current, applying closed-loop control to the output current signal to adjust it to a setpoint current signal, outputting a current control signal corresponding to the closed-loop control, generating a compensation current, which compensates for fluctuations in the output current of the energy storage device, and feeding the compensation current into the second winding of a transformer, which has a first winding, which is coupled to an output connection of the energy storage device, and a second winding, which is galvanically isolated from the first winding.

ADVANTAGES OF THE INVENTION

One concept of the present invention consists in superimposing a compensation current on an output current of an energy storage device with modular energy supply strings comprising a series circuit of energy storage modules, with the result that resonances as a result of current fluctuations of a variable current source fed by the energy storage device are damped. In this case, output currents of the energy storage device are detected and compensation currents are actively generated depending on the output currents detected or the fluctuations in the output currents, wherein the compensation currents can be fed to the variable current source via galvanic coupling together with the actual output currents of the energy storage device. The compensation currents matched flexibly in terms of their amplitude in this case serve to actively damp possible resonances.

As a result of this damping, on-board power supply system resonances can be damped without any additional losses in the power path. By virtue of inherent closed-loop control via the current feedback loop, it is advantageously possible to match the damping to the position of the resonance frequency and the magnification factor of the resonant circuit, irrespective of the instantaneous operating state of the energy storage device. In particular, measurement of the resonant frequency of the energy storage device is no longer necessary. Changes which can occur, for example, owing to aging or changes in the system topology, for example owing to longer high-voltage lines, during operation of the energy storage device are also automatically and flexibly compensated for by the damping circuit.

By virtue of the active closed-loop control, a degree of damping can advantageously be selected by an adjustable frequency range. The energy storage device can in this case be operated in the conventional manner without load current-conducting components needing to be clocked variably in a manner subject to losses.

The damping circuit can advantageously be implemented completely in the low-voltage range by the galvanic decoupling, as a result of which soft switching and a single feed from a 12 volt power supply system is possible. The design and control parameters for the damping circuit are in this case independent of the instantaneous value for an intermediate circuit capacitor connected to the energy storage device.

The damping circuit can advantageously be used in a conventional on-board power supply system. In addition, already existing components, such as a current-limiting inductor, for example, can be used in the configuration of the damping circuit, which results in reduced costs, reduced complexity and reduced requirement in terms of installation space.

In accordance with one embodiment of the damping circuit according to the invention, the damping circuit can furthermore comprise a bandpass filter, which is coupled between the current detection device and the closed-loop control circuit and which is designed to filter frequency components of the output current signal outside a predeterminable frequency range. This advantageously enables damping, as required, in the critical resonant frequency range, with the result that no damping and therefore no unnecessary consumption of resources takes place in uncritical ranges. In particular in frequency ranges in which high powers would otherwise need to be applied for active damping, but damping of the current ripple is not necessarily required at all, this can result in an increase in the efficiency of the damping circuit.

In accordance with a further embodiment of the damping circuit according to the invention, the current detection device can be designed to detect a difference between the output current of the energy storage device and the output current of a DC voltage intermediate circuit, which is connected to the energy storage device. This provides the advantage that it is possible to dispense with a particularly low-induction connection of a current detection device to the intermediate circuit capacitor.

In accordance with a further embodiment of the damping circuit according to the invention, the closed-loop control circuit can have a summing element, which subtracts the output current signal from the setpoint current signal, and a current controller, which generates the current control signal depending on the output signal of the summing element.

In accordance with a further embodiment of the damping circuit according to the invention, the first winding of the transformer can comprise an output-side current limitation inductor of the energy storage device. This has the advantage that the current-limiting inductor already provided in any case can be provided for a dual use in order to save on installation space and components.

In accordance with a further embodiment of the damping circuit according to the invention, the compensation current generation device can have an H-bridge circuit with in each case two switching devices in each of the bridge branches. This provides the advantage that low-resistance low-voltage switches can be used for the switching device which can be used as soft-switching full bridge to implement active closed-loop control of damping with very low losses.

In accordance with a further embodiment of the damping circuit according to the invention, the compensation current generation device can be coupled to a supply connection of one of the energy storage modules and can be designed to be fed a supply voltage from the energy storage module for generating the compensation current. There is therefore no longer any need for an external voltage supply, and the damping circuit can be fed from the energy storage device itself.

In accordance with one embodiment of the system according to the invention, the system can furthermore have a DC voltage intermediate circuit, which is coupled to output connections of the energy storage device. Advantageously, the system can furthermore comprise an inverter, which is coupled to the DC voltage intermediate circuit, and an electric machine, which is coupled to the inverter. The inverter can be designed to convert the voltage of the DC voltage intermediate circuit into an input voltage for the electric machine. This is particularly advantageous since the system comprising the inverter and the electric machine, as variable current source, can feed back currents with frequency-dependent fluctuations into the energy storage device via the DC voltage intermediate circuit. These frequency-dependent fluctuations can be damped particularly effectively via the damping circuit.

Further features and advantages of embodiments of the invention are given in the description below with reference to the attached drawings.

DETAILED DESCRIPTION

Figure 1:
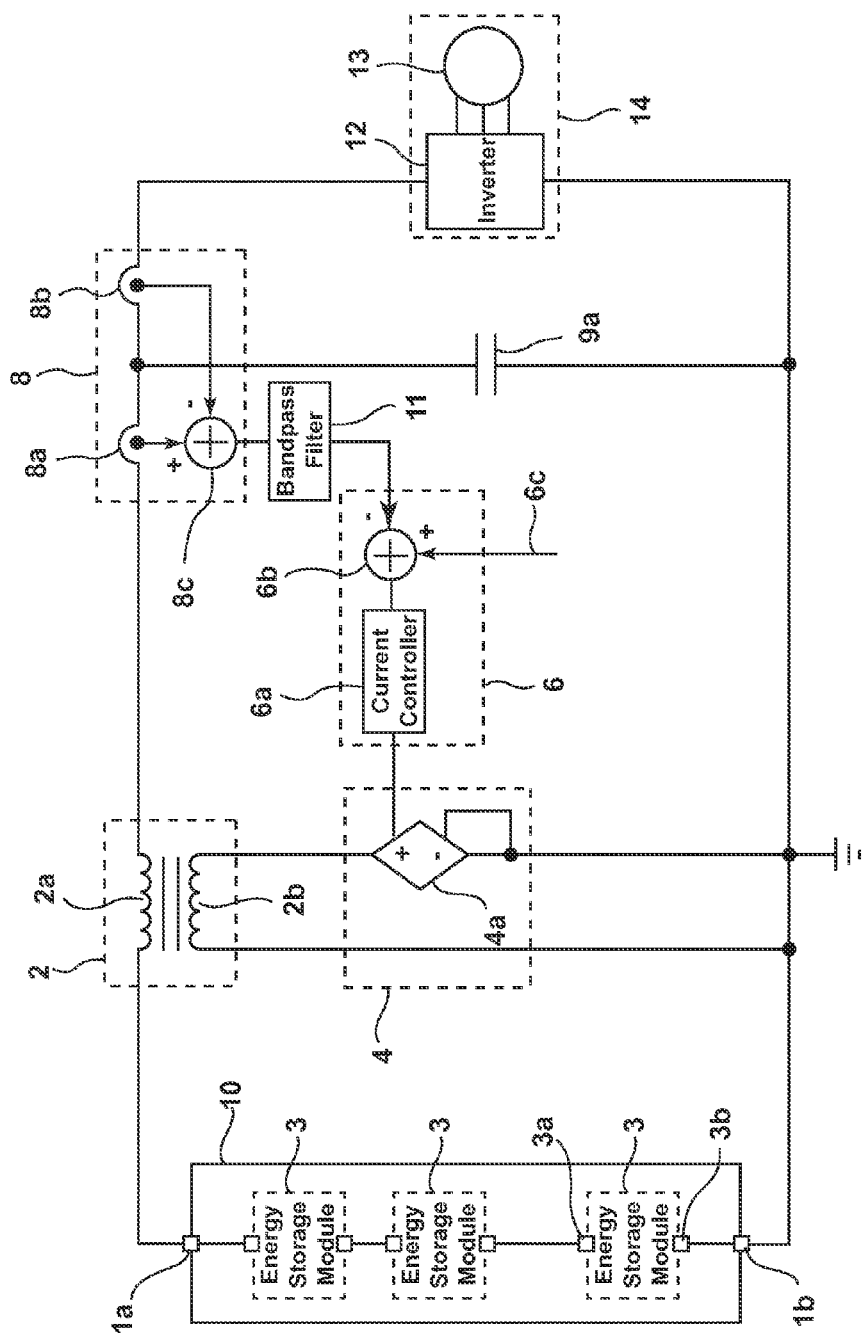
FIG. 1 shows a schematic illustration of a system comprising an energy storage device and a damping circuit in accordance with one embodiment of the present invention.

FIG. 1 shows a system which comprises an energy storage device 10 for providing a supply voltage by energy storage modules 3 connected in series in an energy supply string between two output connections 1a, 1b of the energy storage device 10. The energy storage device 10 can alternatively also have a plurality of energy supply strings connected in parallel. The energy storage device 10 acts as current source of a variable output current owing to the actuation of the energy storage modules 3.

The energy storage device 10 can in this case be coupled to an input connection of a DC voltage intermediate circuit 9a via a storage inductance 2a at the output connection 1a of the energy storage device 10. The storage inductance 2a can be implemented, for example, by a concentrated component, such as a current-limiting inductor, or a plurality of distributed components. Alternatively, parasitic inductances of the energy storage device 10 can also be used as storage inductance 2a. By correspondingly activating the energy storage device 10, the current flow into the DC voltage intermediate circuit 9a can be controlled. If the mean voltage upstream of the storage inductance 2a is higher than the instantaneous intermediate circuit voltage, a current flow into the DC voltage intermediate circuit 9a takes place, and if, on the other hand, the mean voltage upstream of the storage inductance 2a is lower than the instantaneous intermediate circuit voltage, a current flow into the energy storage device 10 takes place. The maximum current is in this case limited by the storage inductance 2a in interaction with the DC voltage intermediate circuit 9a.

The energy storage device 10 has at least two energy storage modules 3 connected in series in an energy supply string. By way of example, the number of energy storage modules 3 in FIG. 1 is two, but any other number of energy storage modules 3 is likewise possible. The energy storage modules 3 each have two output connections 3a and 3b, via which a module output voltage of the energy storage modules 3 can be provided. The module output voltages of the energy storage modules 3 can be added selectively to give the total output voltage of the energy storage device 10.

Figure 3:
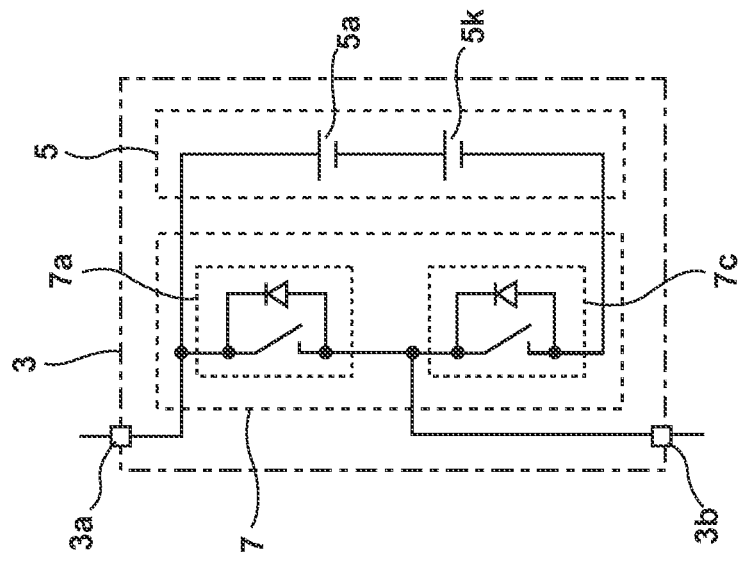
FIG. 3 shows a schematic illustration of a further exemplary embodiment of an energy storage module of an energy storage device in accordance with a further embodiment of the present invention.
Figure 2:
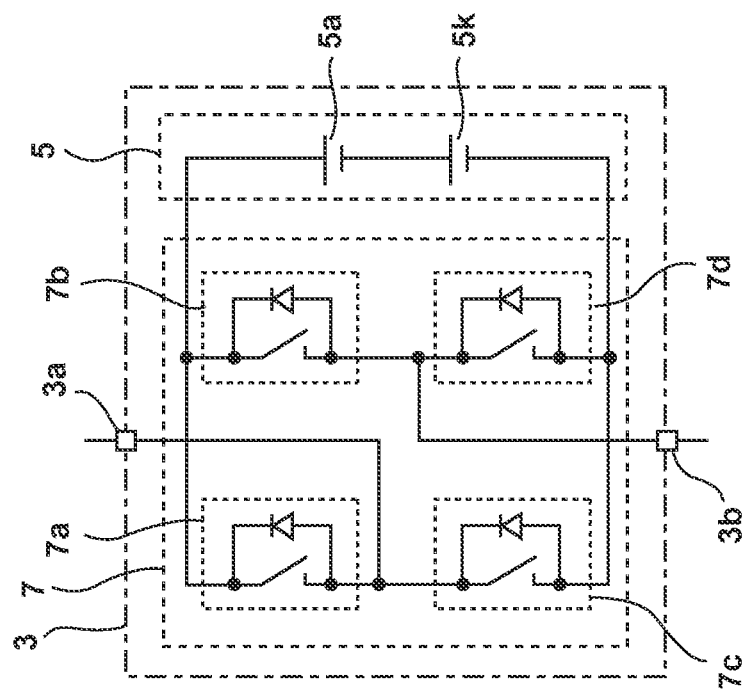
FIG. 2 shows a schematic illustration of an exemplary embodiment of an energy storage module of an energy storage device in accordance with a further embodiment of the present invention.

Exemplary designs of the energy storage modules 3 are shown in FIGS. 2 and 3 in greater detail. The energy storage modules 3 each comprise a coupling device 7 with a plurality of coupling elements 7a and 7c and possibly 7b and 7d. The energy storage modules 3 furthermore comprise in each case one energy storage cell module 5 having one or more energy storage cells 5a, 5k connected in series.

The energy storage cell module 5 can in this case have, for example, batteries 5a to 5k connected in series, for example lithium-ion batteries or rechargeable lithium-ion batteries. In this case, the number of energy storage cells 5a to 5k in the energy storage module 3 shown in FIG. 2 is two, for example, but any other number of energy storage cells 5a to 5k is likewise possible.

The energy storage cell modules 5 are connected to input connections of the associated coupling device 7 via connecting lines. The coupling device 7 is in the form of a full-bridge circuit with in each case two coupling elements 7a, 7c and two coupling elements 7b, 7d, by way of example in FIG. 2. The coupling elements 7a, 7b, 7c, 7d can in this case each have an active switching element, for example a semiconductor switches, and a freewheeling diode connected in parallel therewith. The semiconductor switches can comprise, for example, field-effect transistors (FETs). In this case, the freewheeling diodes can also each be integrated in the semiconductor switches.

The coupling elements 7a, 7b, 7c, 7d in FIG. 2 can be actuated in such a way that the energy storage cell module 5 is connected selectively between the output connections 3a and 3b or such that the energy storage cell module 5 is bridged. By suitably actuating the coupling devices 7, therefore, individual energy storage cell modules 5 of the energy storage modules 3 can be integrated in the series circuit of an energy supply string in a targeted manner.

With reference to FIG. 2, the energy storage cell module 5 can be connected, for example, in the forward direction between the output connections 3a and 3b by virtue of the active switching element of the coupling element 7d and the active switching element of the coupling element 7a being set to a closed state while the other two active switching elements of the coupling elements 7b and 7c are set to an open state. In this case, the voltage $U_M$ is present between the output terminals 3a and 3b of the coupling device 7. A bridging state can be set, for example, by virtue of the two active switching elements of the coupling elements 7a and 7b being set to the closed state while the two active switching elements of the coupling elements 7c and 7d are kept in the open state. A second bridging state can be set, for example, by the two active switches of the coupling elements 7c and 7d being set to the closed state while the active switching elements of the coupling elements 7a and 7b are kept in the open state. In both bridging states, the voltage 0 is present between the two output terminals 3a and 3b of the coupling device 7. Likewise, the energy storage cell module 5 can be connected in reverse between the output connections 3a and 3b of the coupling device 7 by virtue of the active switching elements of the coupling elements 7b and 7c being set to the closed state while the active switching elements of the coupling elements 7a and 7d are set to the open state. In this case, the voltage $-U_M$ is present between the two output terminals 3a and 3b of the coupling device 7.

The total output voltage of the energy supply string can in this case be set in each case stepwise, wherein the number of steps scales with the number of energy storage modules 3. In the case of a number of n first and second energy storage modules 3, the total output voltage of the energy supply string can be adjusted in 2n+1 steps between $-n \cdot U_M, \ldots, 0, \ldots, +n \cdot U_M$.

FIG. 3 shows a further exemplary embodiment of an energy storage module 3. The energy storage module 3 shown in FIG. 3 differs from the energy storage module 3 shown in FIG. 2 only in that the coupling device 7 has two instead of four coupling elements, which are connected to one another in a half-bridge circuit instead of in a full-bridge circuit.

In the variant embodiments illustrated, the active switching elements can be in the form of power semiconductor switches, for example in the form of IGBTs (insulated gate bipolar transistors), JFETs (junction field-effect transistors) or else MOSFETs (metal oxide semiconductor field-effect transistors).

By virtue of the coupling elements 7a, 7b, 7c, 7d, the output voltage of the energy supply string can be varied in steps from a negative maximum value up to a positive maximum value via suitable actuation. The graduation of the voltage level in this case results depending on the graduation of the individual energy storage cell modules 5. In order to obtain, for example, a mean voltage value between two voltage levels predetermined by the graduation of the energy storage cell modules 5, the coupling elements 7a, 7b, 7c, 7d of an energy storage module 3 can be actuated in clocked fashion, for example with pulse width modulation (PWM), with the result that the affected energy storage module 3 produces, when averaged over time, a module voltage which can have a value of between zero and the maximum possible module voltage determined by the energy storage cells 5a to 5k. The actuation of the coupling elements 7a, 7b, 7c, 7d can in this case be performed, for example, using a control device, which is designed to perform, for example, closed-loop control of the current with subordinate open-loop control of the voltage, with the result that graduated connection or disconnection of individual energy storage modules 3 can take place.

The system in FIG. 1 comprises, in addition to the energy storage device 10, also an inverter 12 and an electric machine 13. By way of example, the system in FIG. 1 is used for feeding a three-phase electric machine 13. However, provision can also be made for the energy storage device 1 to be used for generating electrical current for an energy supply system. Alternatively, the electric machine 13 can also be a synchronous or asynchronous machine, a reluctance machine or a brushless DC motor (BLDC). In this case, it can also be possible to use the energy storage device 10 in stationary systems, for example in power stations, in electrical energy generation plants, such as, for example, wind turbines, photovoltaic installations or combined heat and power generation plants, in energy storage installations such as compressed air storage power stations, battery storage power stations, flywheel energy stores, pumped-storage facilities or similar systems. A further use possibility for the system in FIG. 1 consists in passenger or goods transport vehicles which are designed for locomotion on or beneath the water, for example ships, motor boats or the like.

In the exemplary embodiment in FIG. 1, the DC voltage intermediate circuit 9a feeds a pulse-controlled inverter 12, which provides a three-phase AC voltage for the electric machine 13 from the DC voltage of the DC voltage intermediate circuit 9a. However, any other type of converter can also be used for the inverter 12, depending on the required voltage supply for the electric machine 13, for example a DC voltage converter. The inverter 12 can be operated, for example, using space vector pulse width modulation (SVPWM).

By virtue of the actuation of the inverter 12 and the alternating power consumption of the electric machine 13, the composite structure comprising the inverter and the machine acts as a variable current source, with respect to the DC voltage intermediate circuit 9a, which variable current source can excite the resonance circuit comprising the energy storage device 10, the storage inductance 2a and the DC voltage intermediate circuit 9a to resonance. The resonant frequency of this resonance circuit is dependent, inter alia, on the number of connected energy storage modules 3, the instantaneous values for the intermediate circuit voltage and the energy content of the storage inductance. In addition, the resonant frequency can be subject to relatively long-term fluctuations which can be dependent, for example, on the component tolerance, the aging of the components, the temperature and further influences. In order to reduce these oscillations and therefore the ripple of the current towards and away from the DC voltage intermediate circuit 9a, it is necessary to take measures which can be used to damp these resonances or the current ripple.

For this, a current detection device 8 is provided in the system in FIG. 1 as part of a damping circuit, which current detection device is designed to detect an output current of the energy storage device 10 and to generate an output current signal which is dependent on the output current. The current detection device 8 can have, for example, a first current sensor 8a, which detects a current flowing from the DC voltage intermediate circuit 9a into the energy storage device 10 or a current flowing from the energy storage device 10 into the DC voltage intermediate circuit 9a. The current detection device 8 can furthermore have a second current sensor 8b, for example, which detects a current flowing from the DC voltage intermediate circuit 9a into the variable current source 14 or a current flowing from the variable current source 14 into the DC voltage intermediate circuit 9a. The detected currents can be detected, for example, as the difference between the output current of the energy storage device 10 and the output current of a DC voltage intermediate circuit 9a connected to the energy storage device 10. For this, a summing element 8c can be provided in the current detection device 8, which summing element subtracts the currents detected by the first and second current sensors 8a and 8b from one another.

It may also be possible to design the current detection device 8 in such a way that an output current signal is detected within the energy storage device 10 with a plurality of energy supply strings on each of the energy supply strings. This can make it possible to adjust each of the energy supply strings separately, in particular since each of the energy supply strings forms, with the DC voltage intermediate circuit 9a, a dedicated resonant circuit.

The system further comprises, as part of the damping circuit, a closed-loop control circuit 6, which is coupled to the current detection device 8 and which is designed to adjust, by closed-loop control, the output current signal to a setpoint current signal 6c and to output a corresponding current control signal. The closed-loop control circuit 6 can have a summing element 6b for this purpose, which subtracts the output current signal from the setpoint current signal 6c. With the aid of a current controller 6a, the current control signal can be generated depending on the output signal of the summing element 6b. The setpoint current signal 6c can be zero, for example. Alternatively, any other desired value can also be predetermined for the setpoint current signal 6c.

The current control signal can be fed into a compensation current generation device 4, which is coupled to the closed-loop control circuit 6, and which is designed to generate a compensation current depending on the current control signal, which compensation current compensates for fluctuations in the output current of the energy storage device 10. This compensation current can, for example, feed a transformer 2 formed from the storage inductance 2a as first winding and a second winding 2b. The first winding 2a can in this case be galvanically isolated from the second winding 2b.

In the example in FIG. 1, the compensation current generation device 4 can have a voltage source 4a which can be adjusted by the current controller 6a. The voltage source 4a in this case feeds the second winding 2b of the transformer 2. It may be possible, for example, to integrate the storage inductance 2a as magnetization inductance of the transformer 2.

Optionally, a bandpass filter 11 can be provided, which is coupled between the current detection device 8 and the closed-loop control circuit 6 and which is designed to filter frequency components of the output current signal outside a predeterminable frequency range. This prevents, for example, interventions in respect of active damping in frequency ranges in which high powers would be required for adjusting the current ripple but no or no considerable reduction in the current ripple is required.

Figure 4:
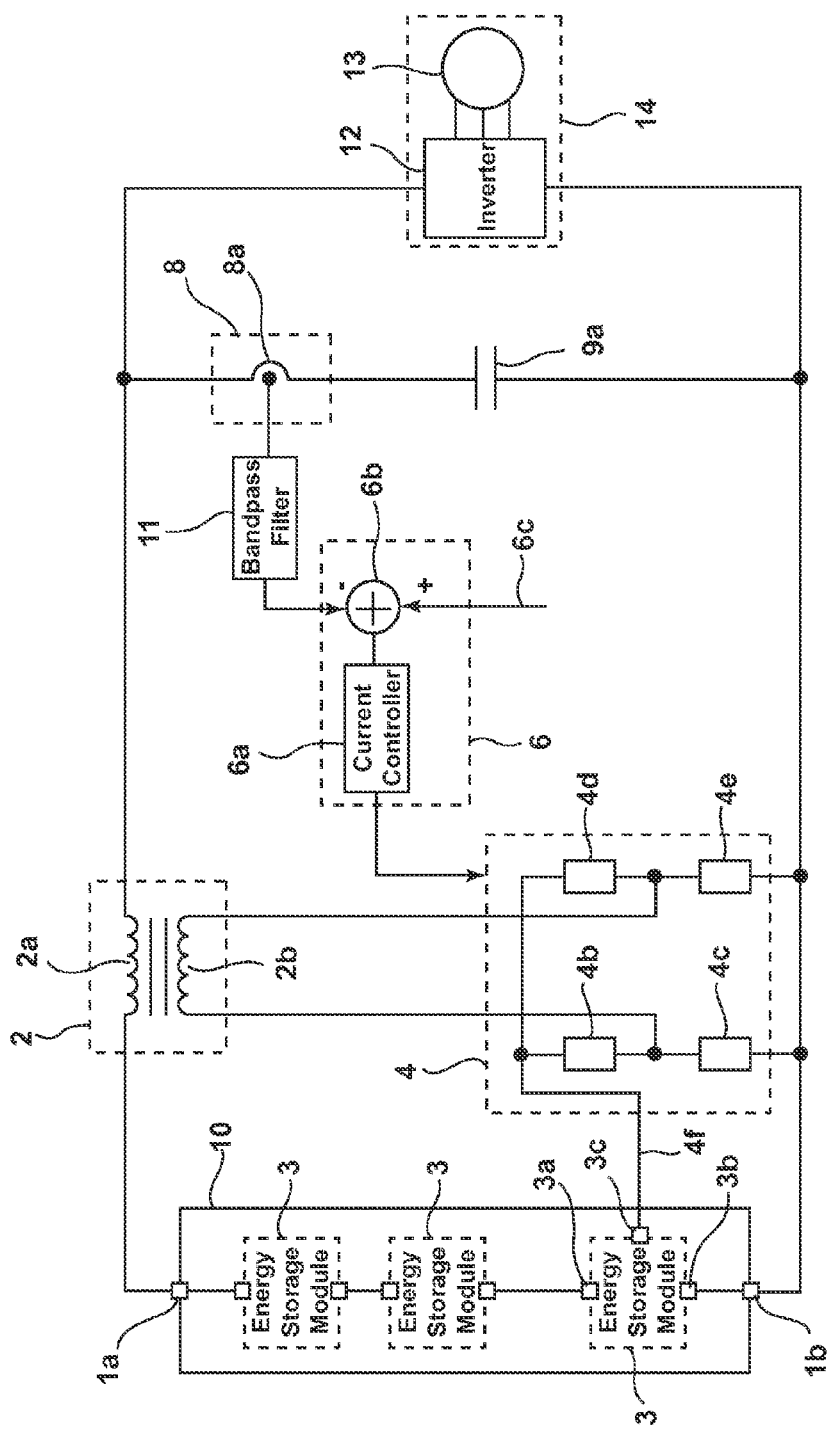
FIG. 4 shows a schematic illustration of a system comprising an energy storage device and a damping circuit in accordance with a further embodiment of the present invention.

FIG. 4 shows a schematic illustration of a further system comprising an energy storage device 10 and a damping circuit. The system in FIG. 4 differs from the system in FIG. 1 substantially in that the compensation current generation device 4 has an H-bridge circuit with in each case two switching devices 4b, 4c, 4d, 4e in each of the bridge branches. The switching devices 4b, 4c, 4d, 4e can comprise low-voltage switches, for example. The switching devices 4b, 4c, 4d, 4e can for example be in the form of power semiconductor switches, for example in the form of IGBTs (insulated gate bipolar transistors), JFETs (junction field-effect transistors) or MOSFETs (metal oxide semiconductor field-effect transistors).

Furthermore, the compensation current generation device 4 can be coupled to a supply connection 3c of one of the energy storage modules 3. A supply voltage can be provided from the energy storage cell module 5 via the supply connection 3c of the energy storage module 3, which supply voltage can be used to feed the compensation current generation device 4. By implementing the compensation current generation device 4 as a full bridge with soft-switching switching devices 4b, 4c, 4d, 4e, low-loss generation of the compensation current for feeding into the second winding 2b of the transformer can be realized.

Figure 5:
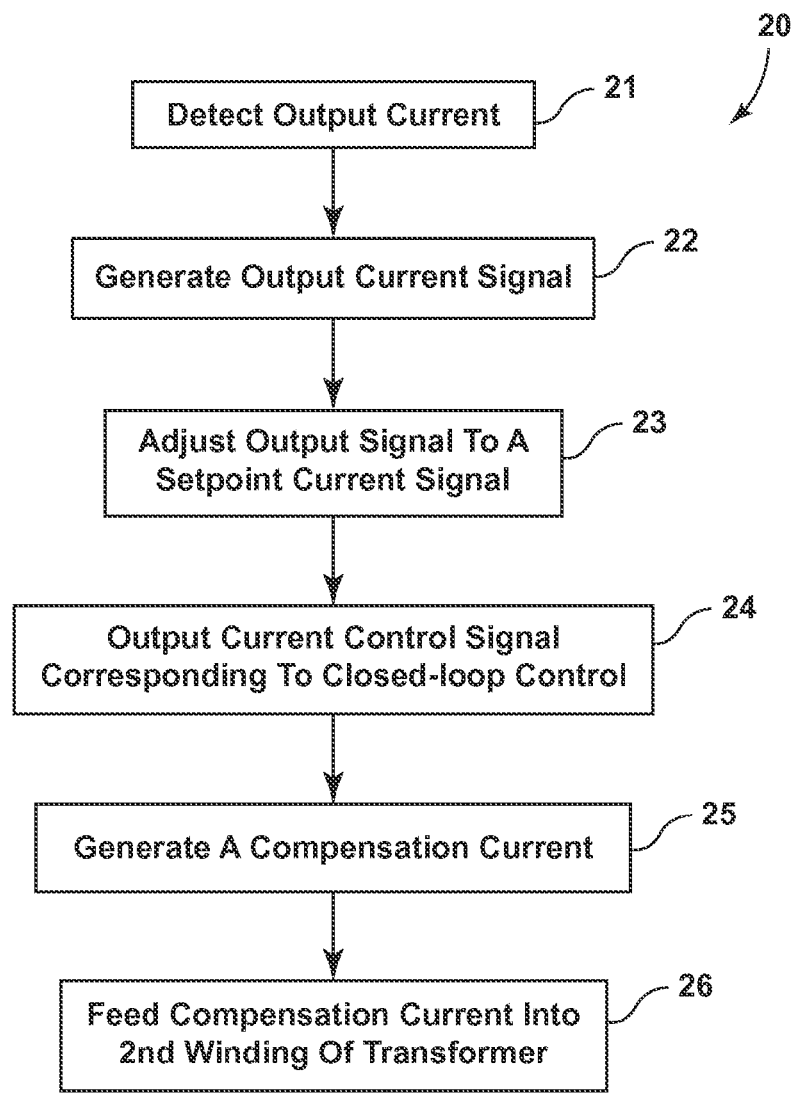
FIG. 5 shows a schematic illustration of a method for damping oscillations of the output current of an energy storage device in accordance with a further embodiment of the present invention.

FIG. 5 shows a schematic illustration of an exemplary method 20 for damping oscillations of the output current of an energy storage device, in particular an energy storage device 10, as is explained in connection with FIGS. 1 to 4. The method 20 can use, for example, a damping circuit as illustrated in FIGS. 1 and 4 for this.

The method 20 for damping oscillations of the output current of an energy storage device 10 comprises, in a first step 21, detection of an output current of the energy storage device. In a second step 22, generation of an output current signal which is dependent on the detected output current is performed. In a third step 23, adjustment, by closed-loop control, of the output current signal to a setpoint current signal is performed. Then, in a fourth step 24, outputting of a current control signal corresponding to the closed-loop control can be performed, whereupon, on this basis, in a step 25, generation of a compensation current can take place, which compensates for fluctuations in the output current of the energy storage device 10. Finally, in step 26, feeding of the compensation current into the second winding 2b of a transformer 2, which has a first winding 2a which is coupled to an output connection 1a of the energy storage device 10 and a second winding 2b, which is galvanically isolated from the first winding 2a, is performed.

What is claimed is:

1. A damping circuit for an energy storage device which comprises one or more energy storage modules connected in series in one or more energy supply strings, said energy storage modules having at least one energy storage cell and a coupling device having a multiplicity of coupling elements, which coupling device is designed to connect the energy storage cell selectively into the respective energy supply string or to bridge said energy storage cell, the damping circuit comprising:
    a current detection device, which is designed to detect an output current of the energy supply strings or the energy storage device and to generate an output current signal dependent on the output current;
    a closed-loop control circuit, which is coupled to the current detection device and is designed to adjust the output current signal to a setpoint current signal and to output a corresponding current control signal;
    a transformer, which has a first winding, which is coupled to an output connection of the energy storage device, and a second winding which is galvanically isolated from the first winding; and
    a compensation current generation device, which is coupled to the closed-loop control circuit and is designed to feed a compensation current, which compensates for fluctuations in the output current of the energy storage device, into the second winding of the transformer depending on the current control signal.

2. The damping circuit according to claim 1, further comprising:
    a bandpass filter, which is coupled between the current detection device and the closed-loop control circuit and which is designed to filter frequency components of the output current signal outside a predeterminable frequency range.

3. The damping circuit according to claim 1, wherein the current detection device is designed to detect a difference between the output current of the energy storage device and the output current of a DC voltage intermediate circuit, which is connected to the energy storage device.

4. The damping circuit according to claim 1, wherein the closed-loop control circuit has a summing element, which subtracts the output current signal from the setpoint current signal, and a current controller, which generates the current control signal depending on the output signal of the summing element.

5. The damping circuit according to claim 1, wherein the first winding of the transformer comprises an output-side current limitation inductor of the energy storage device.

6. The damping circuit according to claim 1, wherein the compensation current generation device has an H-bridge circuit within each case two switching devices in each of the bridge branches.

7. The damping circuit according to claim 6, wherein the compensation current generation device is coupled to a supply connection of one of the energy storage modules and is designed to be fed a supply voltage from the energy storage module for generating the compensation current.

8. A system, comprising:
    an energy storage device, which has one or more energy storage modules, which are connected in series in one or more energy supply strings, said energy storage modules comprising at least one energy storage cell and a coupling device having a multiplicity of coupling elements, which coupling device is designed to connect the energy storage cell selectively into the respective energy supply string or to bridge said energy storage cell; and a damping circuit according to claim 1.

9. The system according to claim 8, further comprising:

a DC voltage intermediate circuit, which is coupled to output connections of the energy storage device.

10. The system according to claim 9, further comprising:

an inverter, which is coupled to the DC voltage intermediate circuit; and an electric machine, which is coupled to the inverter, wherein the inverter is designed to convert the voltage of the DC voltage intermediate circuit into an input voltage for the electric machine.

11. A method for damping oscillations of the output current of an energy storage device, which has one or more energy storage modules, which are connected in series in an energy supply string, said energy storage modules comprising at least one energy storage cell and a coupling device having a multiplicity of coupling elements, which coupling device is designed to connect the energy storage cell selectively into the respective energy supply string or to bridge said energy storage cell, said method comprising the following steps:

detecting an output current of the energy supply strings or the energy storage device;

generating an output current signal which is dependent on the detected output current;

applying closed-loop control to the output current signal to adjust it to a setpoint current signal;

outputting a current control signal corresponding to the closed-loop control;

generating a compensation current, which compensates for fluctuations in the output current of the energy storage device; and feeding the compensation current into the second winding of a transformer, which has a first winding, which is coupled to an output connection of the energy storage device, and a second winding, which is galvanically isolated from the first winding.

\* \* \* \* \*